June 15, 1954

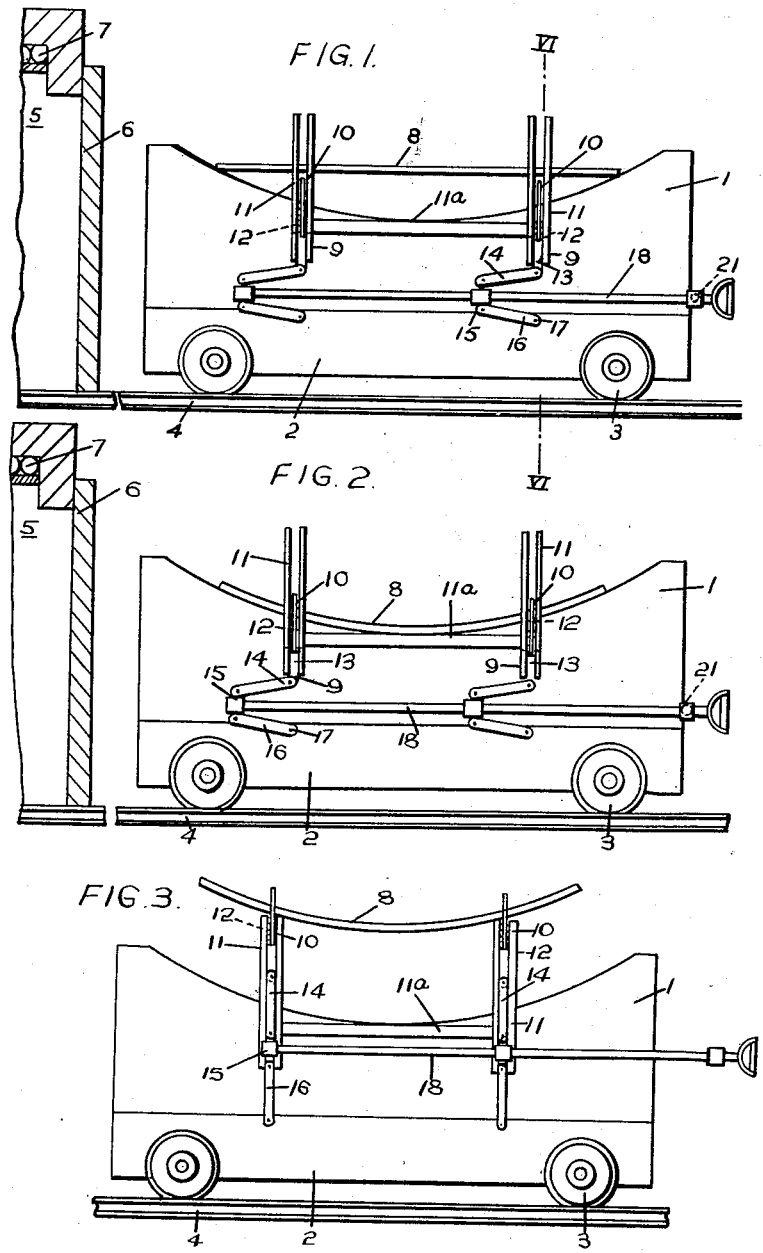

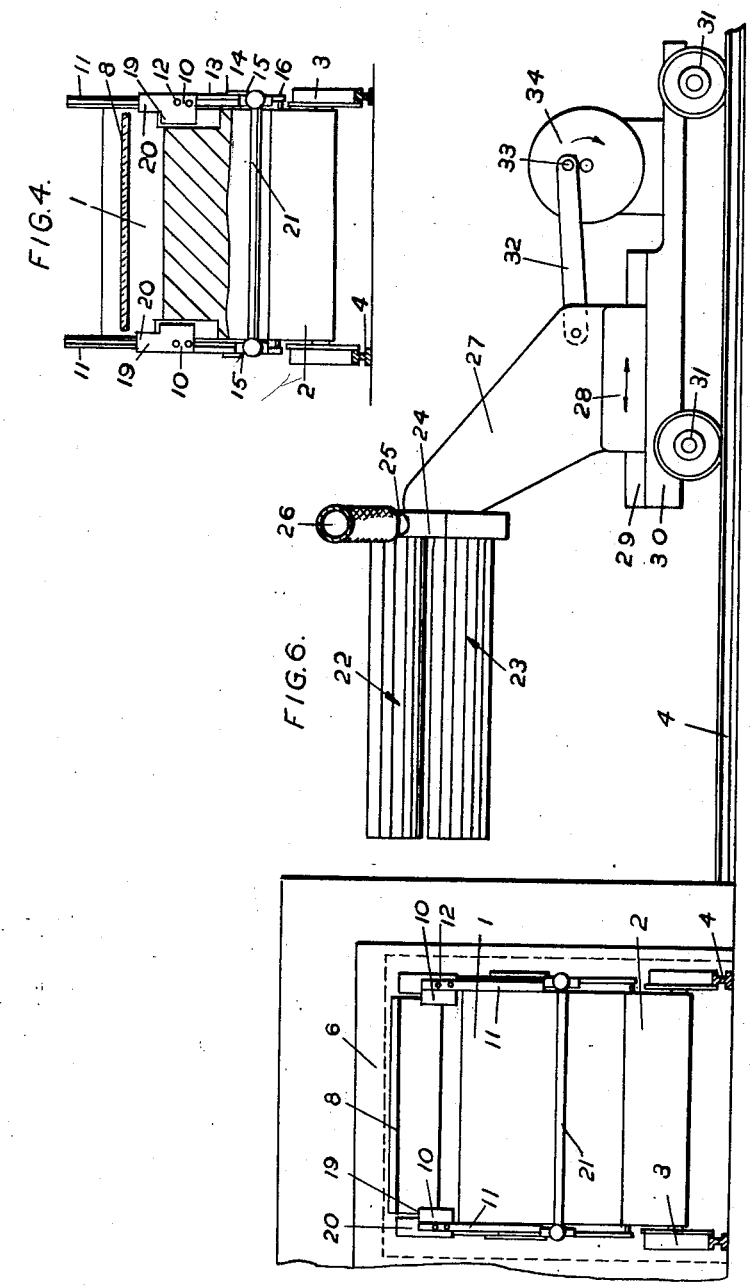

A. W. GROTEFELD 2,680,936

METHOD AND APPARATUS FOR BENDING
AND TEMPERING SHEETS OF GLASS

Filed Aug. 24, 1949

Inventor
Augustus W. Grotefeld
By
Attorney

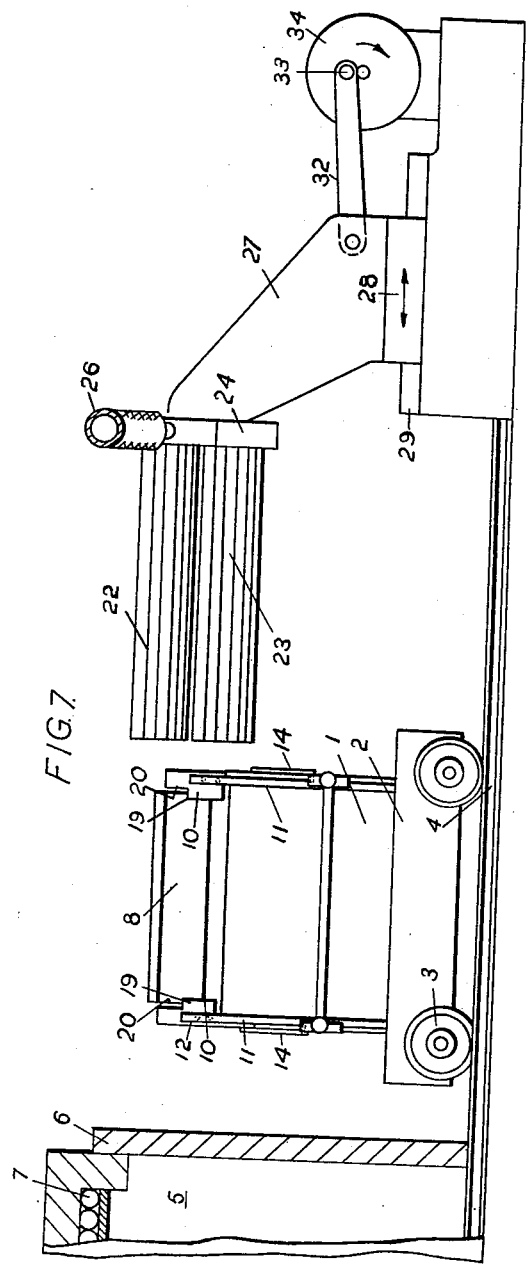

June 15, 1954
A. W. GROTEFELD
2,680,936
METHOD AND APPARATUS FOR BENDING AND TEMPERING SHEETS OF GLASS
Filed Aug. 24, 1949
5 Sheets-Sheet 5
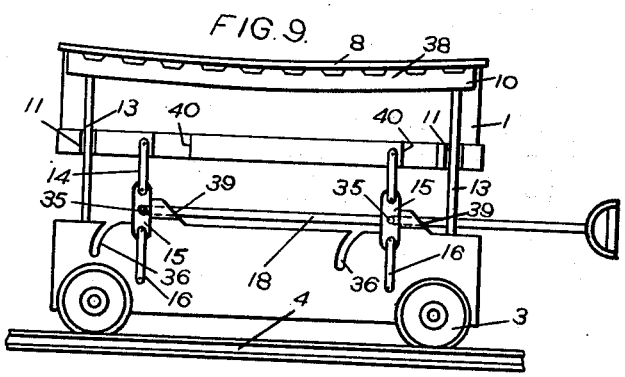
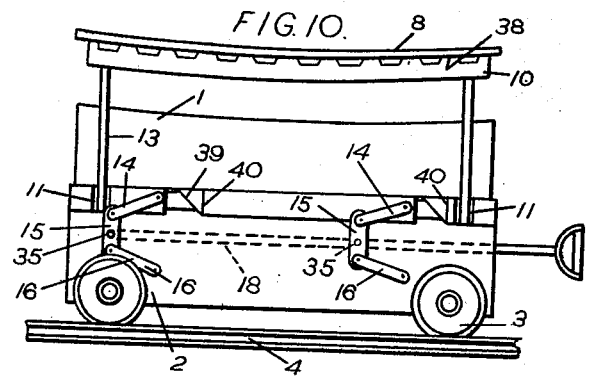
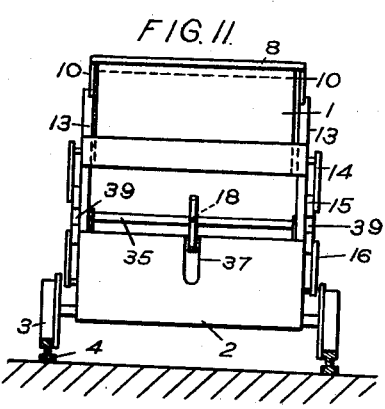
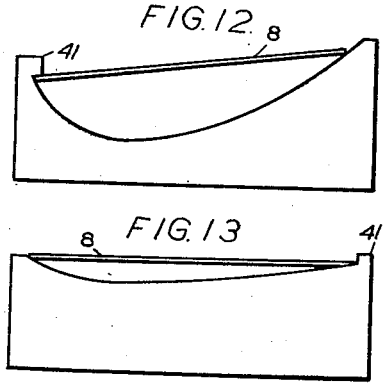
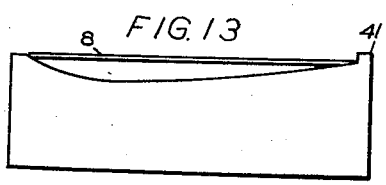
Inventor
Augustus W. Grotefeld
By
Attorney Patented June 15, 1954

2,680,936

UNITED STATES PATENT OFFICE 2,680,936

METHOD AND APPARATUS FOR BENDING AND TEMPERING SHEETS OF GLASS

Augustus William Grotefeld, Wembley, England, assignor, by mesne assignments, to Pilkington Brothers Limited, Liverpool, England, a company of Great Britain Application August 24, 1949, Serial No. 112,116

Claims priority, application Great Britain August 30, 1948

10 Claims. (Cl. 49—7)

This invention relates to the art of bending and tempering sheets of glass.

A main object of the present invention is to devise improved apparatus for bending and tempering sheets of glass in which the bend is produced in a furnace, by allowing each sheet to sag on to a bed, the configuration of which is such as to impart the intended bend to the glass, so that the hot glass is wholly supported and the extent of bending at the centre of the sheet as well as at the edges is precisely limited to that desired, and on removal from the furnace the glass is, in a very brief time, presented for tempering to cooling jets directed to both faces simultaneously.

Apparatus for bending and tempering a sheet of glass constructed according to the present invention, wherein the said sheet is heated to a temperature of incipient softening and is allowed to sag slowly on to a bed mounted on a carriage and is characterized by ancillary supports for carrying the bent glass sheet in spaced relation with the bed on separation of the bent sheet from the bed by relative displacement between the bed and sheet in a vertical direction, and tempering means comprising upper and lower tempering elements located at levels above and below the level of bent glass when carried by the ancillary supports to permit bent glass on the supports to become interposed between them, the elements being adapted to direct a series of jets of quenching fluid to the respective faces of an interposed bent sheet.

With such form of apparatus it is possible to place a flat sheet of glass, e. g., plate glass or window glass on the bed, which bed may have either a concave or convex profile, move the bed and carriage, which latter preferably runs on rails, into a furnace until the desired amount of heat has been imparted to the glass to cause it to sag and adopt the configuration of the surface of the bed, and the carriage and glass thereafter withdrawn from the furnace.

On the carriage being withdrawn the ancillary supports are available to take over the work of supporting the glass, either by raising the supports with respect to the bed in which case the supports are displaceable vertically by hand or treadle or by power-operated means, so as to raise the glass to the desired spaced relation from the bed, or as a result of displacing the bed downwardly, in which case the ancillary supports are fixed vertically.

The bed is preferably fixed on the carriage, and the ancillary supports mounted for vertical displacement to engage the glass, said ancillary supports being hinged to levers mounted on the carriage, and provided with an actuating arm whereby the supports may be simultaneously displaced vertically, to raise the glass from the bed.

The supports are preferably disposed at the sides of the bed but may pass through the bed.

The ancillary supports may comprise glass engaging members which are countersunk below the surface of the bed during the heat treatment and are raised therefrom laterally to space the glass from the bed, when the actuating arm is operated.

The glass engaging members are preferably countersunk in the longer sides of the bed and are stepped to provide vertical faces which prevent lateral movement of the glass when displaced from the bed.

Apparatus constructed according to the present invention may be characterised by tempering means for the glass, comprising opposed upper and lower series of apertured tubes, each series being connected to a conduit through which quenching fluid is supplied to the series, those tubes in the lower series which move in proximity to an ancillary support being unconnected at the ends remote from their conduit so as to straddle the respective support during the relative movement between the glass and the tubes of the tempering means affected as the glass becomes interposed between the upper and lower series of tubes. When the glass sheet has been separated from the bed and is resting solely on the supports, it is moved as rapidly as possible into the tempering position before it has had time to undergo any further appreciable change in form. This is assisted by the fact that the sheet of glass is heated only to the temperature of incipient softening.

The bent sheet of glass may become interposed between the tempering means by moving the carriage so as to bring the glass, supported above the bed by the ancillary supports, between stationary upper and lower tempering elements.

The ancillary supports are dimensioned to pass between tempering elements so that for example when the carriage is moved to interpose the glass between fixed upper and lower elements, the glass being supported from underneath by the ancillary supports, the glass engaging members of the supports readily pass between the elements.

In order that the distance to be travelled by the glass into the quenching elements, or by the quenching elements to straddle the glass, may be a minimum, the motion is preferably in the direction of the shorter dimension of the glass;

and in order that the quenching elements may conform in general curvature to the bent glass and be approximately equidistant from the faces of the glass, the interposition should preferably be in the direction of a generating line of the curve. In glasses such as motor car screens or backlights, for example, the generating line of the curve is usually parallel to the shorter dimension of the glass and both these preferred requirements can be readily met.

In referring to the elements as being fixed, this term is used only in contra-distinction to elements which are bodily moved to a position above or below the glass, and the term includes a relatively fixed element which is given circuitous or oscillatory movement in known manner, to attain more efficient distribution of the jets over the surfaces of the glass being tempered.

The tempering elements may be in the form of air-boxes or chests, the opposed faces of which are suitably apertured to provide the desired number of quenching jets, but preferably the elements are in tubular form, each tube having a series of apertures from which jets of quenching fluid issue, the tempering elements in every case are constructed so as not to foul the ancillary supports when the glass is interposed between them.

In one preferred form of construction, according to the present invention, the tempering means for the glass comprises two series of uniformly spaced parallel tubular fingers spaced apart to straddle the glass when supported in the said spaced relation from the bed, the fingers in each series being preferably arranged so that they are approximately equidistant from that part of the opposed faces of the glass opposite to them, said fingers being connected at one end only to means for conducting quenching fluid to them, and having apertures to direct quenching jets of fluid to both faces of the glass, the tip ends of the fingers being sealed, and the tempering means being reciprocally mounted on guides to advance the fingers axially across the bed and to retract them therefrom.

With such forms of apparatus, on the glass being separated from the bed, the tempering means may at once be advanced simultaneously across the bed so that the quenching jets are delivered equally to both faces of the glass, the glass being raised sufficiently to ensure that neither the presence of the bed nor the radiant heat from the bed adversely affects the tempering operation.

The movable series of tempering means is preferably mounted on brackets erected on a chassis guided for the horizontal displacement relatively to the bed, said chassis carrying power means for actuating the brackets, and the brackets being laterally displaceable on the chassis and connected to the power means so that the tubes may be rapidly reciprocated or oscillated over a relatively small amplitude to assure even distribution of the quenching fluid over the whole area of the glass as is well understood in the art.

The conduit to which the tubes of the movable series are connected may carry flexible connections through which fluid is supplied from the conduit to the tubes and in such case, only the tubes are actuated by the power means. If, however, the tubes are rigidly connected to the conduit, then the structure as a whole is mounted on the brackets so as to be given the requisite circuitous or oscillatory movement.

In one preferred construction, both sets of tubes are mounted on a common conduit, the structure being carried on the bracket which is mounted on the chassis.

The present invention also comprises a method of bending and tempering a sheet of glass, which consists in resting the glass on a refractory or metal bed having the surface configuration intended to be imparted to the glass, then subjecting the rested glass to heat treatment to raise it to softening temperature, and allowing the softened glass to adopt the configuration of the bed surface, by which the shaped glass is then wholly supported at the end of the bending operation, withdrawing the bed and glass from the heating zone, and separating the bed and glass by relative vertical displacement, and immediately directing quenching jets of cooling fluid simultaneously against both surfaces of the glass.

In such method of operation the glass is bent by sagging on to the bed in the furnace. The bent glass on the bed is then rapidly moved from the furnace, and in a brief space of time the glass and bed are separated, so that the glass may be presented to cooling elements from which quenching jets of cooling fluid are immediately and simultaneously directed against both surfaces of the glass.

The present invention also comprises a tempered bent sheet of glass produced by such method of manufacture.

In order that the invention may be more clearly understood, some preferred embodiments thereof will now be described by way of example, with reference to the accompanying diagrammatic drawings:

In the drawings—

Figure 1 is a side elevation of a bed mounted on a carriage and provided with ancillary supports at each longer side of the bed and manually operable means therefor, and cold glass loaded on the bed ready for charging to a furnace.

Figure 2 is a view similar to Figure 1 showing the shaped glass resting on the bed after heat treatment in the furnace.

Figure 3 is also a view similar to Figure 1 showing the ancillary supports carrying the shaped glass raised from the bed.

Figure 4 is a sectional elevation, taken along the line IV—IV in Figure 1, of the bed and ancillary supports as shown in Figure 1, more clearly showing the form of the supports.

Figure 6 is an end view of the bed with the glass supported in raised position and a side elevation of movable quenching means before it has been advanced to the raised glass to straddle the latter.

Figure 7 is a view similar to Figure 6 showing fixed quenching means.

Figure 9 is a view similar to Figure 1 showing a bed which is supported to be vertically displaceable with respect to the shaped glass, and Figure 10 is a view similar to Figure 9 showing the bed in lowered position separated from the glass and Figure 11 is an end view of the bed and glass as shown in Figure 9.

Figures 12 and 13 show in side elevation to reduced scale modification in the bed hereafter referred to.

In the drawings like references designate the same or similar parts.

Figure 5:
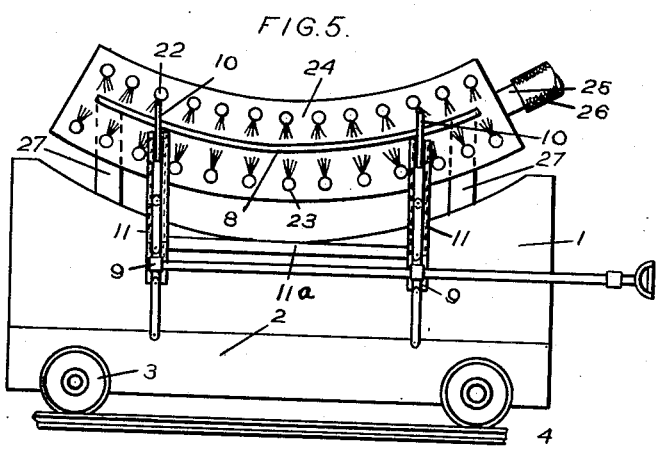
Figure 5 illustrates the raised glass interposed between quenching means disposed above and below the shaped glass to temper the latter.

Referring first to Figures 1 to 4 of the drawings:

A solid bed 1 formed of refractory concrete, slightly longer and wider in plan than the flat glass to be bent the top surface configuration of the bed being devised according to the bend to be imparted to the glass, is mounted on a carriage 2 provided with wheels 3 which run on rails 4 leading into a furnace 5, having doors one of which is indicated at 6.

The furnace is electrically heated by heaters disposed only above the level of the bed as indicated at 7, so that the heat directly radiated from the heaters is directed only to the upper surface of the sheet of glass which is disposed on the bed.

Before the glass is disposed on the bed, the latter is run into the furnace and heated up to near the softening temperature of the glass. It is then withdrawn and the sheet of glass indicated at 8 which is then flat, is laid chord-wise on the hot bed.

The bed 1 with the glass 8 is then returned into the furnace until the glass is heated up to the desired temperature, when it will sag to a controlled extent, predetermined by the surface configuration of the bed, and when such bend is obtained, the glass is wholly supported so that the central area of the glass is free from unintentional degrees of curvature, and further changes in form are avoided.

The bed is vertically rabbetted along the two longer sides as indicated at 9, to house ancillary supports comprising glass engaging means 10 employed in apparatus according to the invention, and channel guides 11 for the supports 10 are provided, the said guides being braced by longitudinal members 11a and the supports having pins 12, which run in the channels, which extend above the bed. These glass engaging means 10 are connected together at each side of the bed for simultaneous operation, and to this end each member 10 is carried on a rod 13 hinged to a link 14 hingedly connected by a plate 15 to a link 16, the latter being pivoted at 17 on the carriage 2, the links at each side of the bed forming part of a parallel link system, actuated by a bar 18 connected to the two respective plates 15, which bar on being displaced causes the rods 13 and members 10 to rise and project from the surface of the bed, and engage the bent sheet of glass lying on the bed and raise it therefrom.

The members 10 are stepped as indicated at 19 so as to provide vertical faces 20 preventing lateral movement in the glas when raised from the bed, and the bars 18 at each side of the bed are connected by a rigid strap 21 which acts as an abutment to hold the ancillary supports in a lowermost position, and retains the parallelism of the bars and ensures simultaneous operation of all the supports 10.

The amount of lift obtained by vertically displacing the ancillary supports (comprising the elements 10 and 13) is sufficient to remove the glass 8 from that area of radiant heat emanating from the bed the intensity of which would adversely affect the quenching jets which, as hereafter explained, are directed to the underside of the glass.

In practice it is found that the glass has only to be raised several inches from the bed in order to obtain a tempering position for the glass in which, though disposed over the hot bed, the rates of temperature drop on both faces of the glass are substantially the same.

According to the size of the glass intermediate rabbets 9 and respective ancillary supports may be added along the longer sides of the bed.

From the foregoing description, it will be observed that the apparatus provided is suitable for transporting a sheet of glass into a furnace, imposing a bend on the glass and for separating the glass from the bed so as to be ready for tempering, practically immediately after withdrawing it from the furnace.

The tempering means illustrated in Figures 5 and 6 include two series of uniformly spaced tubular fingers, 22 and 23, each connected at one end to a mutual header 24, and provided with a pipe 25 attached by a flexible fluid connection 26 to a source of quenching fluid supply (not shown) whereby quenching fluid is supplied to the two series of tubular fingers. The fingers 22 and 23 are sealed at the tips and perforated along their length to form jets so arranged that jets projected from one series of fingers are projected towards the jets emanating from the fingers in the other series. Thus the tempering means comprises opposed tempering grids each grid including a plurality of parallel tubes apertured uniformly along their length to provide quenching jets which are directed to the two surfaces of the glass when interposed between the grids, and the width of the glass engaging means 10 being related to the spacing of the fingers in each grid so as to readily permit relative movement between the fingers and the rods 13 of the ancillary supports.

The two series of fingers 22, 23 are arranged in arcs which correspond in curvature to the surface of the beds and the apertures in the tubes are arranged so that the jets are substantially directed in a direction which is normal to the surface on which the jets impinge.

The header 24 is mounted on vertical brackets 27, one towards each end of the header, which brackets are carried on a runner 28 adapted to be reciprocated to and away from the bed on a slipper 29 comprised in a chassis 30, mounted on wheels 31. The brackets are provided with a pitman 32 connected by a pin 33 to a crank disc 34 driven by an electric motor (not shown). On energising the motor, the fingers are oscillated over the amplitude prescribed by the eccentricity of the pin 33 to effect more even distribution of cooling jets on the glass surfaces as is well understood. The brackets, header and fingers can be moved on the chassis as a whole as desired by the operator, to advance the fingers over the bed to straddle the glass 8 raised above it to retract the fingers clear of the bed to make the glass available for transport by a conveyor system, for example, along an overhead rail (not shown).

From the foregoing, it will be observed that on the glass and bed being removed from the furnace and the glass raised from the bed, the fingers 22, 23 can immediately be projected to overlie both faces of the glass and tempering quickly effected whilst the fingers are oscillated effectively to quench the whole area of the glass.

Figure 8:
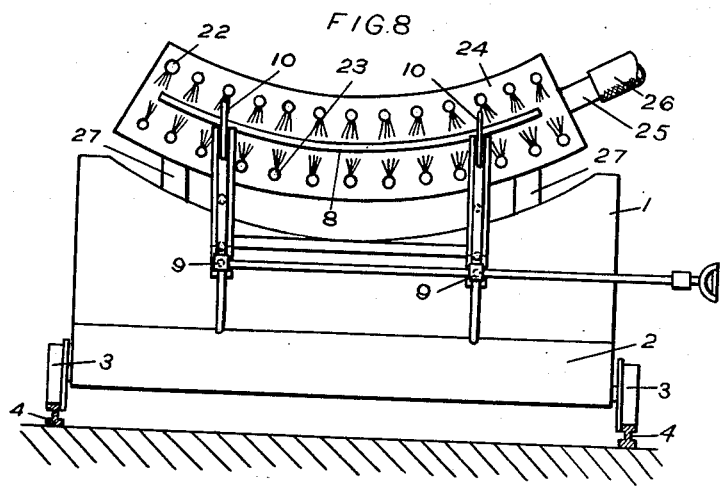
Figure 8 is a front elevation of the quenching means shown in Figure 7, and a side elevation of the bed with glass raised in position for quenching, ready to be pushed up to the quenching means.

In the construction shown in Figures 7 and 8 the quenching means is fixed and the bed is withdrawn laterally from the furnace so that after the glass 8 is raised the bed can be moved further laterally until the glass is interposed between the two series 22 and 23 of tubular fingers, thereby the bed is moved in the direction of the smaller dimension of the bed hence is moved a minimum distance.

Instead of raising the glass from the bed the glass may be separated therefrom by lowering the bed as illustrated in Figures 9 to 11, wherein the bed is shown supported by links 14, 16 connected and operable as already described with reference to Figures 1–7, the bed having recesses 11 by which the bed is guided on the rods 13.

In this construction opposite plates 15 are connected by shafts 35 in turn connected to a central actuating bar 18, the chassis 2 being provided with slots 36 to accommodate the ends of the shafts 35 and to receive the bar 18 in the lowered position of the bed with a slot 37.

In the construction illustrated in Figures 9 to 11 the ancillary supports comprise fixed rods 13 connected by glass engaging means 10 in the form of two strips the upper edge of each of which is castellated as indicated at 38. These castellated strips may be formed of stainless steel and being in nature serrated, correspondingly reduce the contact with glass, and permit ready evacuation of the quenching fluid directed against the underside of the glass. In this construction stops 39 are formed on the carriage to limit the travels of the bars 18, and the bed is rabbetted at 40 to pass over the stops in moving to the lower position.

In all the constructions described the configuration of the surface of the bed may be convex instead of concave as described, or may be formed to present bends with double curvature, the more simple forms being portions of spheres or cylinders respectively, but the curves need not be true arcs of circles. More complex curves comprising, for example, a conical surface or combinations of cone and plane, of cylinder and plane, or of cylinders of differing radii may be presented by the bed configuration.

Alternatively the surface of the bed may comprise two oppositely inclined plane surfaces smoothly connected at the juxtaposed lower ends so as to produce a bend in the glass of shallow V formation.

The bed should as already illustrated preferably be somewhat larger in the direction of curvature than the flat glass to be bent upon it, and it may be provided with stops at one end, when due to the curvature being imparted, there is or may be a tendency for the glass, during the change in shape, to slip on the bed, particularly where a sheet of glass is to be bent more sharply at one end than the other. Such arrangements are illustrated in Figures 12 and 13 wherein the stops 41 are provided by moulding ribs integrally with the bed.

If the bed is of lesser width than the flat glass to be bent it is preferred to use strip metal (e. g. stainless steel) glass engaging members as already described with reference to Figures 9–11.

Alternatively, of course, the bed may be formed from other refractory materials than concrete, for example, from that type of sand known as foundry sand, in which case the sand is located within a tray mounted on the carriage.

The glass engaging member 10 illustrated in Figures 1–8 may be made of the same refractory material as the bed or may be formed of stainless steel in which their width need be no thicker than the diameter of the rods.

By employing apparatus according to the invention, a tempered bent sheet of glass can be produced, through any part of which vision is substantially undistorted.

By the present invention, a relatively simple form of apparatus, easy to operate, is produced, and in use a controlled bending of the glass is obtained, to the elimination of surface distortion of the glass and of the formation of unintentional curvature, thereby any part of the glass vision is substantially undistorted. Moreover the apparatus has the advantage that no loss of heat is incurred by transporting the glass from a furnace to a bending station, nor during a bending operation. Thus the temperature range through which the glass is quenched is a maximum, and highly efficient tempering operations can be effected, whilst the time period during which the glass is unsupported by the bed and still hot enough to change its shape is insufficient for any appreciable change to occur; thereby tempering may be effected on a sheet of glass from which there has been, in substance, no alteration from the shape imposed upon it during the bending operation.

Instead of forming the bed of refractory concrete it may be formed from a suitable heat resisting metal, that is a metal which will not suffer distortion at the temperature concerned; such a metal is stainless steel.

I claim:

1. A method of bending and tempering a sheet of glass consisting in resting the glass on a heat-resisting bed having a surface configuration corresponding to the bend to be imparted to the glass, then subjecting the glass to heat treatment to raise it to a temperature of incipient softening and allowing the glass to sag slowly to adopt the configuration of the surface of the said bed, by which the shaped glass is then wholly supported at the end of the bending operation, rapidly withdrawing the bed and glass from the heating zone and separating the bed and glass by relative vertical displacement to leave the glass supported only by spaced supports, but only for such period of time that it does not sag further to any appreciable extent after it has left the said bed and thereafter directing quenching jets of cooling fluid simultaneously against both surfaces of the glass.

2. In apparatus for bending and tempering a sheet of glass, wherein the said sheet is heated to a temperature of incipient softening and allowed to sag slowly on to a heat-resisting bed having a configuration corresponding to the bend to be imparted to the said sheet, ancillary supports having supporting areas normally located substantially flush with said bed for supporting a sheet of glass after it has been bent on the said bed, means for effecting vertical displacement of the said supports in relation to the said bed for the purpose of separating the said sheet from the said bed so as to rest solely on the said supports, and tempering means comprising upper and lower horizontally disposed tempering elements supported at one end only and located at levels above and below the level of bent glass when carried by the said ancillary supports, to permit said glass on the said supports to become interposed in horizontal direction between said horizontally disposed tempering elements before it has had time to sag further to any appreciable extent after it has left the said bed and before the glass has had time to cool below the temperature at which tempering is to be effected, said elements being adapted to direct a series of jets of quenching fluid on to the respective faces of an interposed bent sheet of glass.

3. In apparatus for bending and tempering a sheet of glass, a heat-resisting bed having a configuration corresponding to the bend to be imparted to the said sheet and on to which the said sheet is allowed to sag slowly after being heated to a temperature of incipient softening, a carriage rigidly supporting the said bed, ancillary supports for supporting a sheet of glass after it has been bent on the said bed, means including levers mounted on said carriage and hinged to said supports and an actuating arm in association with said levers for effecting simultaneous displacement of the said supports in relation to said bed for the purpose of separating the said sheet from the said bed so as to rest solely on the said supports, and tempering means comprising upper and lower tempering elements located at levels above and below the level of bent glass when carried by the said supports, to permit said glass on the said supports to become interposed between said tempering elements before it has had time to sag further to any appreciable extent after it has left the said bed, said elements being adapted to direct a series of jets of quenching fluid on to the respective faces of an interposed bent sheet of glass.

4. In apparatus for bending and tempering a sheet of glass, wherein the said sheet is heated to a temperature of incipient softening and allowed to sag slowly on to a heat-resisting bed having a configuration corresponding to the bend to be imparted to the said sheet, ancillary supports for supporting a sheet of glass after it has been bent on the said bed, said supports including glass-engaging members adapted when the glass is resting on the bed to lie flush with the surface of the said bed, means for effecting vertical displacement of the said supports in relation to the said bed for the purpose of separating the said sheet from the said bed so as to rest solely on the said supports, and tempering means comprising upper and lower horizontally disposed tempering elements supported at one end only and located at levels above and below the level of bent glass when carried by the said ancillary supports, to permit said glass on the said supports to become interposed in horizontal direction between said horizontally disposed tempering elements before it has had time to sag further to any appreciable extent after it has left the said bed and before the glass has had time to cool below the temperature at which tempering is to be effected, said elements being adapted to direct a series of jets of quenching fluid on to the respective faces of an interposed bent sheet of glass.

5. In apparatus for bending and tempering a sheet of glass, wherein the said sheet is heated to a temperature of incipient softening and allowed to sag slowly on to a heat-resisting bed having a configuration corresponding to the bend to be imparted to the said sheet, ancillary supports for supporting a sheet of glass after it has been bent on the said bed, glass-engaging members co-operating with the said supports, said glass-engaging members comprising metal strips extending over one dimension of the said bed and adapted when the glass is resting on the bed to lie flush with the surface of the said bed, means for effecting vertical displacement between the said supports and the said bed for the purpose of separating the said sheet from the said bed so as to rest solely on the said supports and said glass-engaging members, and tempering means comprising upper and lower tempering elements located at levels above and below the level of bent glass when carried by the said supports and said glass-engaging members, to permit said glass on the said supports and said glass-engaging members to become interposed between said tempering elements before it has had time to sag further to any appreciable extent after it has left the said bed, said elements being adapted to direct a series of jets of quenching fluid on to the respective faces of an interposed bent sheet of glass, and said glass-engaging metal strips being serrated along their upper edges to permit of rapid evacuation of said quenching fluid.

6. In apparatus for bending and tempering a sheet of glass, wherein the said sheet is heated to a temperature of incipient softening and allowed to sag slowly on to a heat-resisting bed having a configuration corresponding to the bend to be imparted to the said sheet, ancillary supports having supporting areas normally located substantially flush with said bed for supporting a sheet of glass after it has been bent on the said bed, means for effecting vertical displacement of the said supports in relation to the said bed for the purpose of separating the said sheet from the said bed so as to rest solely on the said supports, and horizontally disposed tempering means supported at one end only and located at levels above and below the level of bent glass when carried by the said ancillary supports, to permit said glass on the said supports to become interposed in horizontal direction between said horizontally disposed tempering elements before it has had time to sag further to any appreciable extent after it has left the said bed and before the glass has had time to cool below the temperature at which tempering is to be effected, whereby a series of jets of quenching fluid can be directed on to the respective faces of an interposed bent sheet of glass, said tempering means comprising opposed upper and lower series of horizontally disposed apertured tubes and a conduit for supplying a quenching fluid to each said series of tubes.

7. In apparatus for bending and tempering a sheet of glass, wherein the said sheet is heated to a temperature of incipient softening and allowed to sag slowly on to a heat-resisting bed having a configuration corresponding to the bend to be imparted to the said sheet, ancillary supports for supporting a sheet of glass after it has been bent on the said bed, means for effecting vertical displacement between the said supports and the said bed for the purpose of separating the said sheet from the said bed so as to rest solely on the said supports, and tempering means located at levels above and below the level of bent glass when carried by the said supports, to permit said glass on the said supports to become interposed between said tempering elements before it has had time to sag further to any appreciable extent after it has left the said bed, whereby a series of jets of quenching fluid can be directed on to the respective faces of an interposed bent sheet of glass, said tempering means comprising opposed upper and lower series of apertured tubes, a conduit for supplying quenching fluid to each said series of tubes, brackets erected on a chassis for supporting each said conduit, and power means on the said chassis for actuating the said brackets, the said brackets being laterally displaceable on the said chassis and connected to the said power means so that the said tubes may be rapidly reciprocated or oscillated after they have been advanced across the said bed.

8. An apparatus according to claim 7, in which the said upper and lower series of tubes and the said conduit for supplying quenching fluid to each said series of tubes are mounted on the respective bracket for simultaneous reciprocable movement across the said bed.

9. An apparatus according to claim 6, in which the said upper and lower series of tubes comprise uniformly spaced tubular fingers sealed at their tips and emanating from the said conduit, the spacing of the said fingers being related to the width of the said ancillary supports so as to permit relative movement between the uniformly spaced fingers and the said ancillary supports.

10. In apparatus for bending and tempering a sheet of glass, wherein the said sheet is heated to a temperature of incipient softening and allowed to sag slowly on to a heat-resisting bed having a configuration corresponding to the bend to be imparted to the said sheet, ancillary supports for supporting a sheet of glass after it has been bent on the said bed, said supports including glass-engaging members countersunk in the longer sides of the said bed to lie flush with the surface of the said bed and stepped to provide vertical faces which prevent lateral movement of the glass when displaced from the said bed, means for effecting vertical displacement between the said supports and the said bed for the purpose of separating the said sheet from the said bed so as to rest solely on the said supports, and tempering means comprising upper and lower horizontally disposed tempering elements supported at one end only and located at levels above and below the level of bent glass when carried by the said ancillary supports, to permit said glass on the said supports to become interposed in horizontal direction between said horizontally disposed tempering elements before it has had time to sag further to any appreciable extent after it has left the said bed, said elements being adapted to direct a series of jets of quenching fluid on to the respective faces of an interposed bent sheet of glass.

References Cited in the file of this patent

UNITED STATES PATENTS

| Number | Name | Date |
| --- | --- | --- |
| 1,107,072 | Houze | Aug. 11, 1914 |
| 1,161,998 | Titus et al. | Nov. 30, 1915 |
| 1,041,329 | Mygatt | July 6, 1920 |
| 2,182,448 | Paddock | Dec. 5, 1939 |
| 2,247,118 | Drake | June 24, 1941 |
| 2,250,628 | Forbes | July 29, 1941 |
| 2,348,887 | Drake | May 16, 1944 |
| 2,369,363 | Paddock et al. | Feb. 13, 1945 |

FOREIGN PATENTS

| Number | Country | Date |
| --- | --- | --- |
| 616,445 | Great Britain | July 4, 1935 |